United States Patent [19]
Duroux

[11] 3,789,834
[45] Feb. 5, 1974

[54] PROCESSES AND APPARATUS FOR THE INVESTIGATION OF INTERNAL PHYSIOLOGICAL PHENOMENA BASED ON MEASUREMENTS OF THE IMPEDANCE VARIATION OF THE SURFACE OF THE BODY

[76] Inventor: Jean Duroux, 12, rue Flatters, Paris, France

[22] Filed: Nov. 14, 1972

[21] Appl. No.: 306,481

[30] Foreign Application Priority Data
Nov. 15, 1971 France .............................. 7140737

[52] U.S. Cl. ............ 128/2.1 Z, 128/1.3, 128/2.05 R
[51] Int. Cl. ............................................. A61b 5/02
[58] Field of Search ........ 128/2.1 R, 2.1 Z, 1.3, 1.5, 128/2.05 R

[56] References Cited
UNITED STATES PATENTS
| | | | |
|---|---|---|---|
| 3,316,896 | 5/1967 | Thomasset | 128/2.1 Z |
| 3,340,867 | 9/1967 | Kubicek et al. | 128/2.1 Z |
| 3,468,302 | 9/1969 | Cowell | 128/2.1 R |
| 3,555,529 | 1/1971 | Brown et al. | 128/2.1 R |
| 3,556,083 | 1/1971 | Grichnik | 128/2.1 Z |

Primary Examiner—Aldrich F. Medbery
Attorney, Agent, or Firm—Sughrue, Rothwell, Mion, Zinn & Macpeak

[57] ABSTRACT

A method of investigating physiological phenomena of a portion of a body based upon the variation of the impedance or resistivity of the body. An electromagnetic field is applied to a portion of the body and the field at the surface of the body is then measured. The components of the measured field are used to determine the impedance or resistivity of the the body.

14 Claims, 12 Drawing Figures

PATENTED FEB 5 1974 3,789,834

PROCESSES AND APPARATUS FOR THE INVESTIGATION OF INTERNAL PHYSIOLOGICAL PHENOMENA BASED ON MEASUREMENTS OF THE IMPEDANCE VARIATION OF THE SURFACE OF THE BODY

BACKGROUND OF THE INVENTION

1. Field of the Invention

The present invention concerns an improvement in or relating to processes used in medicine for the study of internal physiological phenomena based on the measurements of the variation of an impedance measured on the surface of the body.

2. Description of the Prior Art

For several years, examination of pulmonary ventilation, respiratory frequency, cardiac output, the water content of the extravascular sector, lungs or peripheral interstitial tissue, for supervising transfusions and perfusions on operated patients and, again, examination of the circulation in the kidneys, the brain, a limb or other part of the body excluded from or during and following surgical intervention, have resulted in the measurement and study of the variations of the impedance $Z = V_M - V_N/I$, in which $V_M - V_N$ is the voltage picked up between two electrodes M and N, and I the current injected between two other electrodes A and B. The electrodes used for this purpose may be applied to different parts of the body: head, neck, thorax, abdomen, limbs.

The measurement of the differential of the impedance with respect to time $dZ/dt$ is also utilized, being applicable for example to the examination of the contraction of the cardiac muscle and to the recognition of the reciprocal actions of the P (auricle) waves and the QRS (ventricle) complexes.

However, these methods have a number of appreciable disadvantages which may be imputed first of all to the difficulty of obtaining good contacts between electrodes and skin. In addition because of the difficulties of positioning these electrodes, the contact resistance is variable and the effect of the variations of contact resistance therefore, may, being superimposed on the influence of the parameters of internal origin which it is desired to study, make the measurements suspect. Furthermore, the necessary use of large electrode devices involves the exploration of over-extensive areas, thus rendering the examination unselective. To sum up, despite the advantages of this process, in that it avoids the use of methods of investigation involving blood letting, thus eliminating the danger, the measurement of the impedance is lacking in precision, the ratio of signal to noise is often very poor and, in certain cases, such as the study of cardiac output, for example, the results are masked by the coupled effect of respiration.

SUMMARY OF THE INVENTION

The principle object of the present invention is an improvement to the process of investigating physiological phenomena based upon the impedance variations relative to the variations of the electrical resistivity of a predetermined volume of the body and to devices for carrying out the process. The invention is characterized in that the patient is subjected to an electro-magnetic field having a frequency between 10kHz and 100MHz or more, the source of which is localized relative to the part of the body to be examined and the frequency is regulated to define the precise volume of the part of the body to be examined. At least one component of the electro-magnetic field in the vicinity of the volume is picked up for calculating an impedance function, the values of which are registered in order to ascertain the rate of propagation.

This improvement to the conventional investigation process has, as its principal advantage, great precision in carrying out the investigation by virtue of the precision with which a narrow volume can be selected in a direction indicated by positions of the source and the field pick-ups, the depth of the zones affected by the radiation being determined by simple control of the radiation frequency. Furthermore, the four relatively large electrodes applied to the skin in the earlier processes are eliminated. A process is then obtained involving great precision in the measurements, a better signal to noise ratio permitting the use of simple and miniaturizable devices, very precise localization of the area to be studied and easier separation of the various combined effects: pulmonary or cardiac, for example. Since there is no danger to the patient, the process may be applied in the continuous supervision of any seriously affected patient.

BRIEF DESCRIPTION OF THE DRAWINGS

In order that the invention may readily be carried into practice, one embodiment will now be described in detail, by way of example, with reference to the accompanying drawings in which.

DESCRIPTION OF THE PREFERRED EMBODIMENTS

Figure 1:
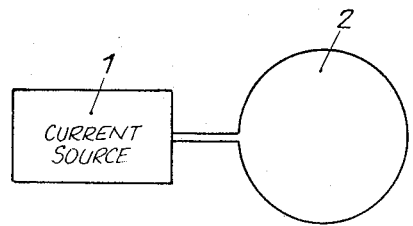
FIG. 1 is a diagrammatic representation of the electromagnetic radiation source.

The emitter device of electro-magnetic radiation is shown diagrammatically in the figures in the form of an electric current source 1 which may be of any desired type, and a search coil 2 having one or more turns fed by the source 1.

The resultant magnetic dipole, which could also be replaced by any other electro-magnetic source such as an electric dipole, for example, may be used in various ways.

According to one method of use, the electromagnetic source represented by the search coil 2, may be placed in a plane perpendicular to the surface of the body 12 (FIG. 3) and at a predetermined distance $r$. The dipole may be provided, if desired, with a conventional capacitor (not shown). A current I of sufficient strength and predetermied frequency $w/2\pi$, in which $w$ is the pulsation, flows through the search coil 2, the current being supplied by the source 1. In the vicinity of the surface of the skin, the module of surface impedance is measured, which is the ratio $|E/H|$ of the amplitude of the components, tangential to the skin, of the electro-magnetic field produced by the dipole: the electrical component E contained in the plane of the emitter search coil and magnetic component H perpendicular to this plane. In selecting a frequency range between 10kHz and 100MHz or more, measurements of the amplitudes of the components E and H of the electromagnetic field produced by the dipole have a rather long period relative to the emission frequency, these measurements therefore only requiring very simple devices. The measurements may be considered as instantaneous with regard to the physiological variations of the inner parameters of the body, since these variations, if they are periodic, have frequencies often lower than a hertz and never greater than a few hundred hertz.

It will be noted that if the body to be studied were a homogeneous medium, it would even be possible then, in addition, to express its electrical resistivity $\rho$ by the equation:

$$\rho = (1/\mu_o{}^w) (E/H)^2 \qquad 1$$

admitting that the physiological media have magnetic permeability $\mu_o$ equal to that of a vacuum, and that the emission frequency is sufficiently high for the body of the subject to be considered as an unbounded semispace.

In view of the fact, however, that the resistivity of the body is not homogeneous, the same equation is used to define an apparent resistivity $\rho a$, this time a frequency function, since the penetration of the electromagnetic radiation in the conducting body is deeper, the lower the frequency; and it will be noted that the fact that the body of the subject occupies only a limited portion of space results, however, in a sufficient approximation to the emission frequencies used.

For measuring the amplitude of the electrical field E, it is only necessary to obtain the difference of potential V between two small electrodes separated by a distance $l$ in simple contact with the skin. E is deduced therefrom by the equation $E = V/l$. These electrodes are shown diagrammatically in FIG. 2 by the element 3 symbolizing any electrical pick-up. It will be noted that, contrary to previous processes, no precaution has to be taken, since the electrodes are used only for the measurement and this in practice does not depend on the resistance between electrodes, provided that the electrodes are connected to a high input impedance measurement chain, a feature which is traditional. The measurement of the amplitude of the magnetic field uses a series pick-up 4 which may be an induction pick-up formed by a small coil, the turns of which are in the plane of the emitter search coil.

The two pick-ups 3 and 4 are connected respectively to the amplification and filtering circuits 5 and 6 which transmit the resultant amplified values to the calculator 7. The latter obtains the quotient $|E/H|$ and, if desired, the calculation, making it possible to establish, practically at any moment, the apparent resistivity according to the equation (1). There is no fundamental difference between the use of the surface impedance or the apparent resistivity. The frequency of the signal, at the frequency of the physiological variations of the inner resistivity, is relatively low compared with the frequency $w/2\pi$ of the emitter dipole. The signal is finally directed towards a registering measuring device or indicator 8. If desired, there may be used, in addition, at the output of the calculator 7, a differentiator 9 to obtain the value of $d|E/H|/dt$ or of $\rho a/dt$ which may itself be registered by the register 8.

The emission frequency $w/2\pi$ employed may be selected as desired within a suitable range. It is known that the depth of penetration p of an electro-magnetic radiation within a resistance conducting medium $\rho$, in which the displacement currents are negligible compared with the conducting currents, (this is the case here with sufficient approximation) is given by the conventional equation:

$$p = \sqrt{2^P/\mu_o{}^w} \qquad 2$$

The following table, given by way of example, shows the depth of penetration as a function of the frequency in a medium of resistivity assumed homogeneous equal to 0.7 ohms $x$ metres which is of the order of magnitude of the resistivity of the physiological serum:

| $w/2\pi$ | 350 kHz | 700 kHz | 1.4 MHz | 2.8 MHz | 5.6 MHz | 11.2 MHz | 22.4 MHz |
|---|---|---|---|---|---|---|---|
| P | 70.7 cm | 50 cm | 35.3 cm | 25 cm | 17.7 cm | 12.5 cm | 8.8 cm |

The use of a frequency selected as desired from any values of the order of frequencies in the table, or possibly higher or lower than the frequencies, thus makes it possible to obtain a depth of investigation as a function of the desired objective. The successive or simultaneous use of several frequencies even makes it possible to obtain an actual probe of the resistivity of the interior of the body at various depths. As the surface impedances or current resistances obtained are applied substantially within a narrow radius of action around a line perpendicular to the plane of the skin rising from the field measurement area, the line constituting the principle axis of symmetry of the phenomena of penetration in the conducting body, a measurement is obtained which relates to a substantially reduced volume of the studied organism, thus representing a very important advantage of the present invention.

By way of example, an order of magnitude of the possible features of the device for carrying out the invention is as follows:

Emitter search coil having only one turn.
Radius of the emitter search coil : 10 cm.
Effective current strength in the search coil : 1 amp.
Emission frequencies: 350 kHz to 22.4 MHz, from octave to octave.
Distance of the emitter from the skin : 1 metre.
Strength of the magnetic field, at a point disposed in the plane of the emitter winding, in the air, at one metre from the emitter : $2.5 \times 10^{-3}$ A/m.
Electric field intensity in the air at 1 metre from the emitter, in the plane of the winding, for 2.8 MHz : 0.55 mV/cm.
Distance between receiving electrodes : 1 cm.
Number of turns on the magnetic pick-up : 10.
Diameter of one turn of the pick-up : 1 cm.
Inductance of the pick-up : $1.6 \times 10^{-6}$ henry.
Agreed capacity of the pick-up : $2 \times 10^{-9}$ farad.
Resonance frequency of the pick-up : 2.8 MHz.
Damping resistance of the pick-up : 28 ohms.
Excess voltage of the pick-up : 1.
Sensitivity of the pick-up to resonance : 0.017V/A/$m$.

It will be noted that, although the emitter has been described as a magnetic dipole formed schematically by a search coil, it is clear that, without changing the invention, this emitter could be an electrical dipole or any other antenna capable of providing, on the surface of the subject's skin, a system of waves, in the vicinity of the measurement point, capable of assimilation with plane waves at right angles thereto. With regard to the magnetic pick-up, it is described as a simple coil but is obvious that it could be replaced by any other magnetic pick-up of comparable performance, without changing anything pertaining to the invention.

Figure 2:
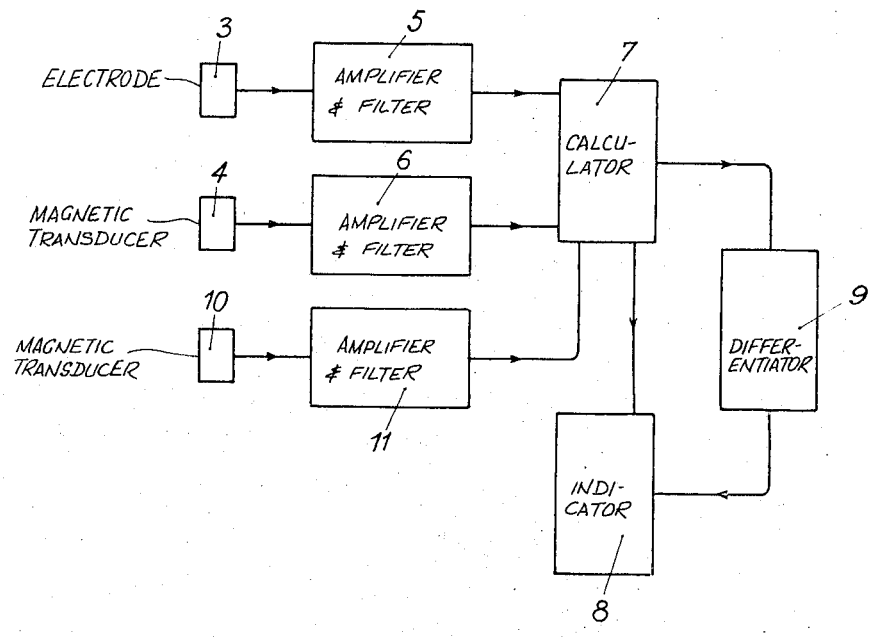
FIG. 2 is a diagrammatic representation of the field pick-up and calculating devices and devices registering variations in the calculated impedance functions.
Figure 4:
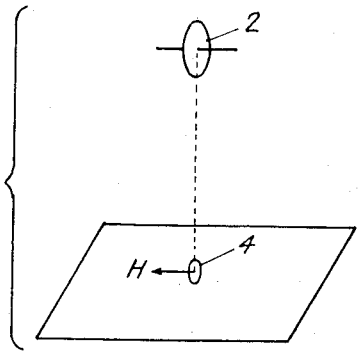
Figure 5:
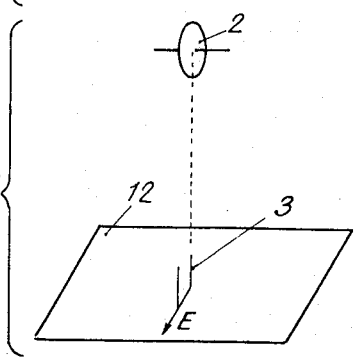

According to one variation of the invention, and without modifying the apparatus, it would be sufficient to register only one of the two components E or H, by means of the corresponding pick-up 3 as shown in FIG. 5, or 4 as shown in FIG. 4, using amplifiers 5 or 6 of FIG. 2, connected to the register 8, directly or after passing to the differentiator 9.

Figure 6:
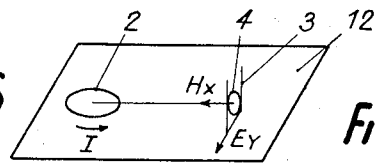

According to another method of using the electromagnetic source, as shown in FIG. 6, a search coil may be used, fed with current of a predetermined frequency, but located this time on the surface of the body, its center being at a distance $r$ from the pick-ups, $r$ being of the order of a few centimeters in excess of 50 centimeters, the search coil 2 having a diameter appreciably smaller than the distance $r$. The pick-ups are used to measure the radial magnetic component Hx relative to the emitter search coil and the transverse electric component Ey.

The thus modified device no longer corresponds to a system permitting measurements practically under conditions of plane waves at right angles thereto. However, the results in surface impedance, Ey/Hx or the apparent resistivity may be utilized according to formula (1), although these values have not exactly the same ratios as the internal electrical resistivities of the body, as in the case of the first device described. However, the rates of propagation of the surface impedance or of apparent resistivity are always significant of the physiological phenomena to be observed.

A particular feature of the device is that it eliminates locating the emitter at a distance from the body and thus obtains the advantage of executing the measurements with a very compact device which can even be left on the subject of the experiment.

Figure 7:
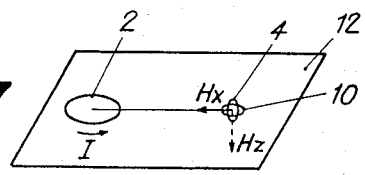

According to another variation, as shown in FIG. 7, the afore-mentioned device is provided with an additional magnetic pick-up 10 for measuring the component Hz perpendicular to the skin. In this manner, simultaneous measurements of the amplitude of the Hx and Hz components of the electro-magnetic field are effected by means of magnetic pick-ups 4 and 10, to register the variations of the ratio Hx/Hz, or an apparent resistance according to the equation:

$$\rho a = \frac{\mu_0 w r^2}{9 \left(\frac{Hx}{Hz}\right)^2} \quad (3)$$

Figure 8:
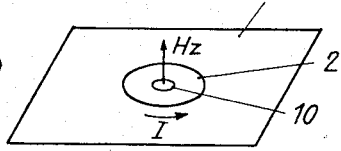

Another variation as shown in FIG. 8 consists of the emitter search coil of the device of the first variation, applying it to the skin, and associating therewith only one magnetic pick-up 10, situated in the center or near the center of the emitter search coil having radius a, the axis of the pick-up being practically the same as the axis of the coil 2, FIG. 1.

The pick-up 10 is connected to an amplification and filtering chain 11, then directly to the measurement registering apparatus 8. In this manner a voltage proportional to the variations of the field amplitude Hz in the center of the search coil is registered. If the coil is in series, it is possible in addition to calculate immediately either the mutual impedance Z of the two dipoles, emitter 2 and receiver 4, relative to their mutual impedance $Z_o$ in the vacuum:

$$\left|\frac{Z}{Z_0}\right| = Hz\left(\frac{2a}{I}\right) \quad (4)$$

or an apparent resistivity expressed by:

$$\rho a = Hz\left(\frac{a^3 \mu_0 w}{3Y}\right) \quad (5)$$

by means of the calculator 7.

Figure 3:
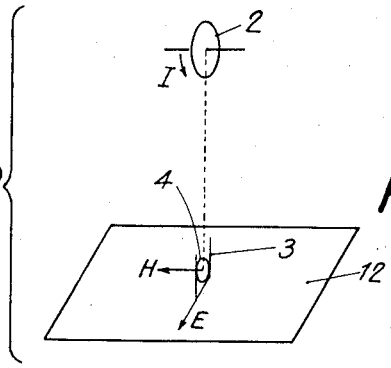
FIGS. 3 – 12 are diagrams of the localization of the emitter source and of the field pick-ups relative to the surface of the body.
Figure 9:
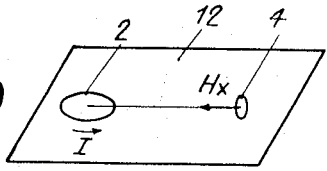
Figure 10:
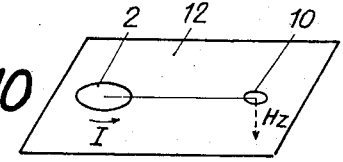
Figure 11:
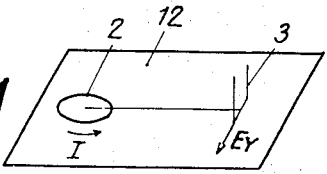

Other variations may comprise using, with the emitter search coil 2 on the skin and only one of the three pick-ups 4 as shown in FIG. 9, or 10 as shown in FIG. 10 or 3 as shown in FIG. 11, of the components Hx, Hz or Ey, located at a distance in the order of only a few centimeters up to 50 centimeters or more from the center of the emitter coil which still has a diameter appreciably smaller than the space between said coil and the pick-up and equal for example, to one third of the distance $r$. The fields can be registered directly or calculated by using the mutual impedance between the emitter and receiver relative to the mutual impedance in a vacuum, or an apparent resistivity, according to the following equations in which $H_o$ and $E_o$ are the components of the field in the air, instead of measuring it, but in the absence of the subject of the experiment and of any conducting body:

$$\left|\frac{Z}{Z_0}\right| = \left|\frac{Hz}{H_0}\right| \quad (6)$$

and $$\rho a = \left|\frac{Hz}{H_0}\right| \left(\frac{r^2 \mu_0 w}{18}\right) \quad (7)$$

for Figure 10

$$\left|\frac{Z}{Z_0}\right| = \left|\frac{Hx}{H_0}\right| \quad (8)$$

and $$\rho a = \left(\frac{Hx}{H_0}\right)^2 \left(\frac{r^2 \mu_0 w}{6}\right) \quad (9)$$

for Figure 9

$$\left|\frac{Z}{Z_0}\right| = \left|\frac{Ey}{E_0}\right| \quad (10)$$

and $$\rho a = \frac{Ey}{E_0} \left(\frac{r^2 \mu_0 w}{6}\right) \quad (11)$$

for FIG. 11.

Figure 12:
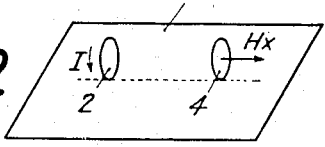

The two dipoles, emitter 2 and receiver 4, as shown in FIG. 12 may also be arranged on the same axis, the planes of the windings, parallel with each other, being perpendicular to the plane of the skin and as close as possible to this plane, the distance between the emitter and the receiver increasing from a few centimeters to 50 centimeters or more.

The component of the magnetic field parallel to the skin is measured, directly in this case, or a mutual impedance between the emitter and the receiver, relative to their mutual impedance in vacuum, expressed by $$\left|\frac{Z}{Z_0}\right| = \left|\frac{Hx}{H_0}\right| \quad 12$$

Finally, instead of considering the measurements of the amplitudes of electromagnetic fields, it would also be possible, according to the same processes and devices, to consider phase-shift measurements of the various components relative to the emission current or to separate their component in phase and their component squared relative to the same emission current.

It is obvious that the calculator 7 and the differentiator 9 may be of any desired type and that they make it possible to perform the stated functions, as also their various differential quotients, the registration of which facilitates examination of the variations of the physiological phenomena concerned.

I claim:

1. A method investigating physiological phenomena of a portion of a body based upon the variation of the impedance or resistivity of the body comprising
   a. positioning a source of electromagnetic energy relative to the portion of the body;
   b. applying an electromagnetic field to the body such that the field is localized to the portion of the body;
   c. regulating the frequency of the electromagnetic field to control the depth of penetration into the portion of the body;
   d. measuring at least one component of the electromagnetic field at the surface of the portion of the body; and
   e. using the measured component of the electromagnetic field to determine the impedance or resistivity of the body.

2. The method of claim 1 further including differentiating the measured component of an impedance function thereof to obtain the impedance or resistivity.

3. The method of claim 1 wherein the electromagnetic field is applied using a magnetic dipole formed by a search coil through which a current of a given frequency $w/2\pi$ flows, and wherein the plane of the search coil is perpendicular to the portion of the body to be examined and wherein the calculation of the values of the impedance function is effected by the measurement of the amplitude of the electrical component E contained in the plane of the emitter coil and by the measurement of the amplitude of the magnetic component H perpendicular to this plane on the surface of the skin at right angles to the coil or in its immediate vicinity, the value of the function being equal to $\left|\frac{E}{H}\right|$ or to $$\rho a = \left(\frac{1}{\mu_0 w}\right)\left(\frac{E}{H}\right)^2$$

in which $\mu_0$ is the magnetic permeability of the vacuum, $w$ the pulsation and $\rho a$ the apparent electrical resistivity of the body, and wherein the field E is measured using two fine adjacent electrodes in simple contact with the skin and the field H is measured using a coil located on the skin perpendicular to the source and in the plane thereof.

4. The method of claim 3 wherein the depth of investigation in the resistivity medium $$\rho = \sqrt{\frac{2\rho}{\mu_0 w}} \quad \text{or} \quad \rho = \frac{2\rho a}{\mu_0 w}$$

is regulated by selecting a particular frequency.

5. The method of claim 1, wherein the electromagnetic field is applied using a magnetic dipole comprising a search coil fed by a current of predetermined frequency, the coil resting on the surface of the body to be examined wherein the axis of a pick-up for measuring the magnetic field and the straight line joining the points for the application of electrodes for measuring the electrical field are perpendicular to the axis of the source, and located externally of the search coil wherein the pick-ups are arranged to measure the amplitude of the radial magnetic component Hx relative to the emitter search coil and the amplitude of the transverse electrical component Ey, and in that the value of the function $$\left|\frac{Ey}{Hx}\right| \quad \text{or} \quad \rho a = \left(\frac{1}{\mu_0 w}\right)\left(\frac{Ey}{Hx}\right)^2$$

is determined.

6. The method of claim 1, wherein the amplitude of the field components Ex and Hz of the electromagnetic field, perpendicular to the skin, are measured and the value of the function $$\left|\frac{Hx}{Hz}\right| \quad \text{or} \quad \rho a = \frac{\mu_0 w r^2}{9(Hx)^2}$$

is determined in which r is the distance from the receivers to the center of the dipole, and wherein electromagnetic field is applied by a search coil resting on the surface of the skin, the component Hz being in the plane of the search coil and the component Hx having its axis perpendicular to the axis of the search coil.

7. The method of claim 1 wherein the magnetic field is applied using a dipole formed by a search coil, through which the strong current I flows, the dipole being in contact with the skin, and wherein the amplitude of the magnetic field Hz is measured by means of a pick-up formed by a coil having the same axis as the search coil and wherein the values of the mutual impedance function $|Z/Z_0| = |H/Hz|$ $(2a/I)$ are determined in which Zo is the mutual impedance in a vacuum.

8. The method of claim 5 wherein the value of the function $\rho a = |Hz| (a^{3\mu} o w/3 I)$ is determined.

9. The method of claim 5, wherein the values of any one of the functions:

$$\left|\frac{Z}{Z_0}\right| = \left|\frac{Hz}{H_0}\right| \quad \text{and} \quad \rho a = \frac{Hz}{H_0}\left(\frac{r^2\mu_0 w}{18}\right)$$

$$\left|\frac{Z}{Z_0}\right| = \left|\frac{Hx}{H_0}\right| \quad \text{and} \quad \rho a = \left(\frac{Hx}{H_0}\right)^2 \left(\frac{r\mu_0 w}{6}\right)$$

$$\left|\frac{Z}{Z_0}\right| = \left|\frac{Ey}{E_0}\right| \quad \text{and} \quad \rho a = \frac{Ey}{E_0}\left(\frac{r^2\mu_0 w}{6}\right)$$

are determined and wherein Ho and Eo are the fields of the diple in a vacuum.

10. The method of claim 1, wherein the amplitude of the Hx field is measured by using a pick-up coaxial with a search coil of the dipole located near the skin for applying the electromagnetic field, the plane of the search coil being perpendicular to the surface of the skin and wherein the value of $|Z/Z_0| = |Hx/Ho|$ is determined.

11. The method of claim 1, wherein the phase shift of the various components relative to the emission current is measured.

12. The method of claim 1, wherein the components of the electromagnetic field and their squared components are measured relative to the emission current.

* * * * *

UNITED STATES PATENT OFFICE
CERTIFICATE OF CORRECTION

Patent No. 3,789,834  Dated February 5, 1974

Inventor(s) JEAN DUROUX

It is certified that error appears in the above-identified patent and that said Letters Patent are hereby corrected as shown below:

IN THE SPECIFICATION:

-Column 3, line 15: the correct formula is: $\rho = \dfrac{1}{\mu_o w} \left(\dfrac{E}{H}\right)^2$ -Column 3, line 67: delete "$\rho$a/dt" and insert "d$\rho$a/dt"

-Cols. 3, 4, line 20: the depth of penetration is "p" and not "P" as printed.

-Column 4, line 10: the correct formula is: $p = \sqrt{\dfrac{2\rho}{\mu_o w}}$

-Column 6, line 51; equation (11): insert brackets, as follows: $\left|\dfrac{Ey}{Eo}\right|$

IN THE CLAIMS:

Claim 2, delete "of an impedance function thereof".

Claim 4, delete the given formula and insert therefor:

$p \sqrt{\dfrac{2\rho}{\mu_o w}}$ or $p = \sqrt{\dfrac{2\rho a}{\mu_o w}}$

Claim 6, correct the equation to read: $\rho a = \dfrac{\mu_o w r^2}{9\left(\dfrac{Hx}{Hz}\right)^2}$ Claim 8, correct the equation to read: $\rho a = |Hz|\dfrac{a^3 \mu_o w}{3 I}$
line 50,
Claim 9, correct the equation to read: $\rho a = \left|\dfrac{Hz}{Ho}\right|\left(\dfrac{r^2 \mu_o w}{18}\right)$

[Continuation on next sheet]

UNITED STATES PATENT OFFICE
CERTIFICATE OF CORRECTION

Patent No. 3,789,834          Dated February 5, 1974

-- 2 --

Inventor(s) JEAN DUROUX

It is certified that error appears in the above-identified patent and that said Letters Patent are hereby corrected as shown below:

IN THE CLAIMS (Continued):

Claim 9, line 53, the correct formula reads: $\rho a = \left(\frac{Hx}{Ho}\right)^2 \left(\frac{r^2 \mu_o w}{6}\right)$ Claim 9, line 56, the correct formula reads: $\rho a = \left|\frac{Ey}{E_o}\right| \left(\frac{r^2 \mu_o w}{6}\right)$ Claim 12 (amended). The method of claim 1 wherein [the components of the electromagnetic field and their squared components are measured relative to the emission current] the measured electromagnetic field components are in phase and 90° out of phase with respect to the emission current.

Add the following claims:

Claim 13. The method of claim 1 wherein the measured component of the electromagnetic field is an impedance function which is used to obtain the impedance or resistivity of the body.

Claim 14. The method of claim 1 further including taking the second derivative of the measured component to obtain the impedance or resistivity Signed and sealed this 26th day of November 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,789,834                         Dated February 5, 1974

Inventor(s) Jean DUROUX

It is certified that error appears in the above-identified patent and that said Letters Patent are hereby corrected as shown below:

IN THE SPECIFICATION:

Col. 6, Line 10, equation (5):

delete "Y" and insert --I--.

Signed and sealed this 3rd day of June 1975.

(SEAL)
Attest:

RUTH C. MASON
Attesting Officer

C. MARSHALL DANN
Commissioner of Patents
and Trademarks